United States Patent [19]

Paeglis et al.

[11] Patent Number: 4,589,804
[45] Date of Patent: May 20, 1986

[54] METHOD FOR WATERPROOFING SURFACES

[75] Inventors: Arnis U. Paeglis, Woodbury; Ebon P. Weaver, Naugatuck, both of Conn.

[73] Assignee: Uniroyal Chemical Company, Inc., Middlebury, Conn.

[21] Appl. No.: 479,377

[22] Filed: Mar. 28, 1983

[51] Int. Cl.$^4$ .............................................. C09K 17/00
[52] U.S. Cl. ..................................... 405/270; 156/71; 156/308.4; 405/53; 428/57; 428/58; 428/141; 428/143; 428/192; 428/193; 428/244; 428/246; 428/492
[58] Field of Search ................ 524/559; 428/263, 465, 428/492, 141, 142, 143, 57, 58, 61, 141, 192, 193, 194, 247, 246; 156/71, 308.4; 405/52, 53, 270; 52/90, 96, 746, 748

[56] References Cited

U.S. PATENT DOCUMENTS 4,480,062 10/1984 Paeglis .................................. 524/394

Primary Examiner—James J. Bell
Attorney, Agent, or Firm—John A. Shedden

[57] ABSTRACT

A waterproof membrane comprising an elastomeric sheet, said sheet formed of a composition which includes a neutralized acid group containing elastomeric polymer, the neutralized acid group cation selected from the group consisting of ammonium, antimony, aluminum, iron, lead and a metal of Group IA, IIA, IB or IIB of the Periodic Table of Elements and mixtures thereof; a non-polar process oil; carbon black and a preferential plasticizer is disclosed. In a preferred embodiment the membrane is supported with a supporting sheet, said sheet selected from the group consisting of fabrics, paper and metal foil. The use of this membrane as a roof covering, pond, pit or aqueduct liner is recited. The method of forming the membrane, and the resultant roof covering, pond, pit or aqueduct liner is also disclosed.

30 Claims, No Drawings

METHOD FOR WATERPROOFING SURFACES

BACKGROUND OF THE DISCLOSURE

1. Field of the Invention

The instant invention is directed to a weatherable, heat sealable membrane and waterproof coverings made from said membrane. The membrane is made from elastomeric compositions produced by extrusion or calendering. The membrane may be unsupported or supported.

2. Description of the Prior Art

A recently emerging trend in the field of roofing is the displacement of the familiar built-up asphalt roofing with membrane roofing. Advantages of the new systems include ease of installation, a safer working environment for the applicator, greater resistance to cold cracking and longer term leak protection.

Another leading growth area is the utilization of ponds and pits for disposal of wastes of chemical plants, petroleum refineries, power plants and mining installations. To insure against seepage of aqueous wastes, liners must be provided. Thus, the development of pond and pit liners is a growing industrial concern.

Two membrane types, elastomeric and thermoplastic, are utilized in this new technology. A leading elastomeric membrane is vulcanized EPDM while an example of a thermoplastic membrane is plasticized PVC.

Both membrane types have advantages and disadvantages. Vulcanized EPDM has outstanding resistance to outdoor weathering, good cold flexibility, high strength and excellent elongation. Its major disadvantage is the necessity of using adhesives for seaming the membrane to provide a continuous leak-free roof covering. Such adhesives are expensive and time-consuming to apply and are prone to delaminate under stressful conditions because of their low strength. This leads to leaks. Plasticized PVC offers surer seams because the material, being thermoplastic, can either be heat sealed or solvent welded to give an integral seam of high strength. Such membranes, however tend to lose plasticizer with time resulting in short useful life and poor cold crack resistance.

In recent years, new classes of polymers have been developed which are based on chemically modified elastomers especially saturated backbone elastomers such as EPDM and Butyl rubber. More specifically, the polymers are modified in such a way as to introduce an ionic group on the polymer. Thus, they may be referred to in general as "ionomers."

Among this new class of "ionomers" are sulfonated elastomers and carboxylated elastomers. These polymers are derived from polymeric materials having olefinic unsaturation, especially elastomeric polymers such as EPDM rubber. U.S. Pat. No. 3,642,728, incorporated herein by reference, teaches a method of selective sulfonation of olefinic unsaturation sites of an elastomeric polymer to form an acid form of a sulfonated elastomeric polymer. The olefinic sites of the elastomeric polymer are sulfonated by means of a complex of a sulfur trioxide donor and a Lewis base. The $SO_3H$ groups of the sulfonated elastomer are readily neutralized with a basic material to form an ionically crosslinked elastomer having substantially improved physical properties over an unsulfonated elastomer at room temperature. However, these ionically crosslinked elastomers may be processed like a conventional thermoplastic at elevated temperatures under a shear force in the presence of selected preferential plasticizers which dissipate the ionic associations at the elevated temperatures thereby creating a reprocessable elastomer.

The basic materials used as neutralizing agents are selected from organic amines or metallic bases in which the metal ion is selected from Groups I, II, III, IV, V, VIB, VIIB and VIII of the Periodic Table of Elements and mixtures thereof.

A further development of sulfonated polymers is provided by U.S. Pat. No. 3,836,511, incorporated herein by reference, which teaches an improved process for the sulfonation of the olefinic sites of the elastomeric polymer. The patent discloses the use of an improved sulfonating agent selected from acetyl sulfate, propionyl sulfate and butyryl sulfate. The neutralizing agents employed to neutralize the acid form of the sulfonated elastomeric polymers are organic amines.

A still further development of these sulfonated polymers is furnished by U.S. Pat. No. 4,222,914, incorporated herein by reference, which teaches a further improved process for the sulfonation of the olefinic sites of the elastomeric polymer and subsequent neutralization of the resulting polymer sulfonic acid to form a zinc sulfonate. The patent describes the reaction of a cement of the polymer with an acyl sulfate followed by neutralization with a solution of zinc acetate dissolved in methanol or methanol/water.

Another still further improvement in this class of sulfonated polymers is provided by U.S. Pat. No. 3,870,841, also incorporated herein by reference. This patent teaches a method for plasticization of the polymeric backbone of a neutralized sulfonated polymer by means of a polymer chain plasticizer which is a liquid compound having a boiling point of at least about 120° F. The polymer chain plasticizer is selected from a dialkyl phthalate, a process oil or an organic acid ester.

A more recent development in sulfonated polymers is disclosed in U.S. Pat. No. 3,847,854 incorporated herein by reference. This patent teaches a method of improving the processability of neutralized sulfonated elastomeric polymers by the addition of a preferential plasticizer which has at least one functional constituent which exhibits a bond movement whose absolute value is at least 0.6 Debyes, and must be a liquid at the desired processing temperature of the neutralized sulfonated elastomeric polymer.

A still more recent development in sulfonated polymers is disclosed in U.S. Pat. No. 4,157,992, incorporated herein by reference. This patent teaches a method of improving the weathering stability and processability of neutralized sulfonated elastomer blend compositions by the mixture of carbon black, inorganic filler and non-polar process oil.

A second new class of elastomeric "ionomers" is the class of carboxylated elastomers. These polymers are derived from polymeric materials having olefinic unsaturation especially elastomeric polymers such as EPDM. U.S. Pat. No. 3,884,882, incorporated herein by reference, describes an adduct of maleic anhydride and EPDM rubber and the resultant ionomer obtained by the reaction of the adduct with a divalent metal salt of a weak acid, the metal selected from Group II of the Periodic Table of Elements, and an accelerator having an active hydrogen atom.

Further development of these carboxylated polymers is provided by U.S. Pat. No. 3,997,487, incorporated herein by reference, which discloses an elastomeric material formed by reacting an adduct of maleic anhydride and EPDM rubber with a rosin salt of a divalent or monovalent metal.

Although these ionomers represent a significant development in the elastomeric arts, none of these advances have found application in the waterproof membrane arts. That is, none of the aforementioned disclosures, explicitly suggest, implicitly imply or make obvious their use in any application which requires a waterproof membrane, covering or the like wherein the membrane or covering requires long term exposure to the elements.

BRIEF SUMMARY OF THE INVENTION

The instant invention is directed to a waterproof, heat sealable membrane especially useful as a roof membrane, pond and pit liner and to a total covering made from such a membrane, especially a roof covering. The membrane, made from an elastomeric ionomer, is formed by extrusion or calendering. The membrane may be supported or unsupported. Such a membrane, and covering, combines in one system the advantages of a thermoset elastomer, such as vulcanized EPDM, in providing outstanding resistance to outdoor weathering, high strength and good cold flexibility while at the same time offering the sure seaming of a thermoplastic system through its ability to be heat sealed to provide an integral seam of high strength.

In accordance with the instant invention, a waterproof membrane is provided. The membrane comprises an elastomeric sheet. The sheet includes a neutralized acid group containing elastomeric polymer, the neutralized acid group containing a cation selected from the group consisting of ammonium, antimony, aluminum, iron, lead and a metal of Groups IA IIA, IB or IIB of the Periodic Table of Elements and mixtures thereof. The sheet also includes a non-polar process oil, carbon black and a preferential plasticizer.

DETAILED DESCRIPTION

The instant invention is directed to a novel membrane useful as waterproof covering for roofs, liners for ponds and pits and the like. It is also directed to a total roof covering, a pond liner or a pit liner made from such a membrane. The membrane of the invention may be produced by either calendering or extrusion of an ionomer based on a modified elastomeric polymer. The membrane may be unsupported or supported by a non-woven or woven fabric, paper or metal foil.

One preferred class of elastomeric ionomers which may be used to prepare the membrane of this invention is the neutralized acid group containing polymers derived from EPDM terpolymers. EPDM terpolymers are unsaturated polymers containing ethylene, propylene and a non-conjugated diene in which the unreacted double bond of the diene is present in a side chain. In a preferred embodiment, the non-conjugated diene monomer, which may be used in the EPDM terpolymer, is selected from the group consisting of 1,4-hexadiene, dicyclopentadiene and 5-ethylidene-2-norbornene. One method by which the EPDM terpolymer of this invention is produced is found in U.S. Pat. No. 3,341,503 which is incorporated herein by reference.

The EPDM polymer used in the formation of the neutralized acid group containing elastomeric polymer contains between 40 and 80 weight percent ethylene and between 1 and 10 percent diene monomer. The balance of the polymer is propylene. Preferably, the EPDM polymer contains between 50 and 70 weight percent ethylene and between 2 and 7 weight percent diene monomer. More preferably, the EPDM elastomeric polymer has a Mooney viscosity (ML-4, 100° C.) of less than 60 although higher molecular weight EPDM polymers may be used. With a Mooney viscosity of less than 60, solubility is optimized.

In carrying out the present invention, the EPDM elastomeric polymer is dissolved in a non-reactive solvent such as a chlorinated aliphatic hydrocarbon, a chlorinated aromatic hydrocarbon, an aromatic hydrocarbon or an aliphatic hydrocarbon such as carbon tetrachloride, dichloroethane, chlorobenzene, benzene, toluene, xylene, cyclohexane, pentane, isopentane, hexane, isohexane or heptane. Of these, the preferred solvents are aliphatic hydrocarbons and especially the lower boiling temperature aliphatic hydrocarbons.

Another preferred class of elastomers which may be formed into the neutralized acid group containing polymers of this invention are the Butyl rubbers. "Butyl rubber" is a term commonly used to describe copolymers made from a polymerization reaction mixture having therein from 70 to 99.5% by weight of an isoolefin which has 4 to 7 carbon atoms, e.g. isobutylene, and 0.5 to 30% by weight of a conjugated multiolefin having 4 to 14 carbon atoms, e.g. isoprene. The resulting copolymer contains 85 to 99.8% by weight of combined isoolefin and 0.2 to 15% by weight of combined multiolefin.

Butyl rubber generally has a Staudinger molecular weight of 20,000 to 500,000, preferably 25,000 to 400,000, especially 100,000 to 400,000, and a Wijs Iodine No. of 0.5 to 50, preferably 1 to 15. The preparation of Butyl rubber is described in U.S. Pat. No. 2,356,128 which is incorporated by reference.

For the purposes of this invention, the Butyl rubber may have incorporated therein from 0.2 to 10% of combined multiolefin; preferably, 0.5 to 6%; more preferably, 1 to 4%, e.g. 2%.

Butyl rubbers having a viscosity average molecular weight of 5,000 to 85,000, preferably 25,000 to 60,000, and a mole percent unsaturation of 1 to 5% may be the elastomeric polymers used to produce the polymers of this invention.

In a preferred embodiment the acid group, subsequently neutralized to produce the polymer of the instant invention, is a sulfonate. When a sulfonate is employed, a sulfonating agent is added to a solution of the elastomeric polymer and non-reactive solvent at a temperature in the range of between −100° C. and 100° C. for a period of time of between 1 and 60 minutes. More preferably, the sulfonating agent is added for a period in the range of between 2 and 45 minutes at a temperature in the range of between 15° and 30° C. Most preferably, the sulfonating agent is added at a temperature in the range of between 20° and 25° C. for a period of between 5 and 30 minutes. Typical sulfonating agents, employed in the instant invention, are those described in U.S. Pat. Nos. 3,642,728 and 3,836,511 which are already incorporated in this application by reference. Specifically, these sulfonating agents are selected from the group consisting of an acyl sulfate, a mixture of sulfuric acid and an acid anhydride and a complex of a sulfur trioxide donor and a Lewis base containing oxygen, sulfur or phosphorus. Typical sulfur trioxide donors are $SO_3$, chlorosulfonic acid, fluorosulfonic acid, sulfuric acid, and oleum. Typical Lewis bases are: dioxane, tetrahydrofuran, or triethylphosphate. Most preferred among the sulfonating agents for use in this invention is an acyl sulfate selected from the group consisting of benzoyl, acetyl, propionyl and butyryl sulfate. The acyl sulfate can be formed in situ in the reaction medium or pregenerated before its addition to the reaction medium.

The sulfonation reaction, in the preferred embodiment wherein a sulfonating agent and an elastomeric polymer are the reactants, results in a sulfonated elastomeric polymer having between 10 and 50 milliequivalents of neutralized sulfonate groups per 100 grams of elastomeric polymer. More preferably, there are between 15 and 45 meq. neutralized sulfonate groups and most preferably between 20 and 40 neutralized sulfonate groups per 100 grams of elastomeric polymer. It is emphasized that neither the particular sulfonating agent used nor the manner of sulfonation is critical, provided that the sulfonating method does not degrade the polymeric backbone.

Neutralization of the acid form of the sulfonated elastomeric polymer is preferably accomplished by addition of a solution of a basic salt dissolved in a solvent system consisting of an aliphatic alcohol optionally containing some water to the acid form of the sulfonated elastomeric polymer. The cation of the basic salt is selected from ammonium, antimony, aluminum, iron, lead or a metal of Groups I-A, II-A, I-B or II-B of the Periodic Table of Elements and mixtures thereof. The anion of the basic salt is selected from a carboxylic acid having from 1 to 4 carbon atoms, a hydroxide or alkoxide and mixtures thereof. The preferred neutralizing agent is a metal acetate, preferably zinc acetate. Sufficient metal salt of the carboxylic acid is added to the solution of the acid form of the elastomeric polymer to effect neutralization. It is preferable to neutralize at least 95% of the acid groups, more preferably 98% and most preferably 100%.

The neutralized sulfonic acid group containing elastomeric polymer cannot ordinarily be worked at conventional processing temperatures. However, certain compounds which act to disrupt the ionic crosslinkage of the neutralized sulfonated elastomeric polymer act as plasticizers in that they permit the neutralized sulfonated containing elastomeric polymer to be processed at lower temperatures. Such plasticizers are termed "preferential plasticizers." These preferential plasticizers are so named because they "plasticize" the ionic bonding in preference to the polymeric substrate.

Preferential plasticizers preferred for use in this invention are selected from the group consisting of a basic salt of a carboxylic acid having from 2 to 30 carbon atoms, preferably from 5 to 22 carbon atoms, wherein a metal ion of such basic salt is selected from the group consisting of aluminum, iron, antimony, lead and a metal of Groups IA, IIA, IB or IIB of the Periodic Table of Elements and mixtures thereof. Among the preferred carboxylic acids, from which the salt is derived, are lauric, myristic, palmitic, stearic and mixtures thereof. Of these, stearic and lauric are most preferred. The most preferred metal ions of the basic salt are zinc, magnesium and calcium. The especially most preferred preferential plasticizer is zinc stearate.

Another preferred preferential plasticizer is an organic amide having the formula $R^1CONR^2R^3$ where $R^1$ is an aliphatic radical and $R^2$ and $R^3$ are independently hydrogen, alkyl, aryl, aralkyl or $-CH_2CH_2NHCOR^1$ with the limitation that at least one of $R^1$, $R^2$ and $R^3$ has at least 5 carbon atoms. Examples of preferential plasticizers from among this class of organic amides are stearamide, ethylenebis(stearamide), ethylenebis(lauramide) and ethylenebis (hexanoamide).

A second type of preferred elastomeric ionomers which may be used to prepare the membrane of this invention is a class of neutralized carboxylated elastomers. These neutralized carboxylated elastomers are again derived from polymeric materials having olefinic unsaturation especially elastomeric polymers such as EPDM and Butyl rubber. However, the acid group in this preferred embodiment is carboxylate. A useful member of this class is an adduct of maleic anhydride and EPDM rubber described in U.S. Pat. No. 3,884,882, herein incorporated by reference, and an elastomeric ionomer obtained by its treatment with a Group II divalent metal salt of a weak acid and an accelerator having an active hydrogen atom. Treatment of the maleic anhydride/EPDM adduct with a rosin salt of a divalent or monovalent metal, described in U.S. Pat. No. 3,997,487, incorporated herein by reference, also form an elastomeric ionomer.

The carboxylation reaction, in the preferred embodiment wherein a carboxylating agent and an elastomeric polymer are the reactants, results in a carboxylated elastomeric polymer having between 10 and 100 milliequivalents of COOH groups per 100 grams of elastomeric polymer. More preferably, there are between 20 and 90 meq. COOH groups, and most preferably, between 30 and 80 COOH groups, per 100 grams of elastomeric polymer. It is emphasized that neither the particular carboxylating agent used, nor the manner of carboxylation is critical, provided that the carboxylating method does not degrade the polymeric backbone.

Unlike the sulfonate acid group, the carboxylate often times can be worked without the use of a preferential plasticizer. Thus, although a plasticizer of the type described above may be included, in one preferred embodiment there is no preferential plasticizer employed in the elastomeric composition when the composition includes a neutralized carboxylated elastomeric polymer.

The neutralized sulfonated or carboxylated elastomeric polymer composition used to prepare the membrane of this invention also includes a non-polar process oil. The non-polar process oil employed in this composition includes less than 4 weight percent polar type compounds as measured by molecular type clay gel analysis. These oils are selected from paraffinics ASTM Type 104B, as defined in ASTM-D-2226-70, aromatics ASTM Type 102 or naphthenics ASTM Type 104A, wherein the oil has a flash point, as determined by the Cleveland open cup method, of at least 350° F., a pour point of less than 40° F., a viscosity in the range of between 70 and 3,000 SSU at 100° F. and a number average molecular weight of 300–1,000, more preferably between 300 and 750. Of these oils, paraffinics are most preferred.

Another component of the neutralized sulfonated or carboxylated EPDM terpolymer composition used to prepare the membrane of this invention is carbon black. Carbon blacks range widely in physical and chemical properties. Physically, they vary in average particle size, particle size distribution, specific surface area, porosity of surface and tendency of the individual primary particles to be associated in chain-like structure. Chemically, they vary in the population and nature of oxygenated structures combined with their surface.

As those skilled in the art are aware, of significant importance to the use of a membrane in an outdoor environment is the membrane's weatherability. This characteristic can be correlated to the heat aging resistance of the membrane. Carbon black is an effective absorber of solar radiation. It is generally believed that solar radiation, to which a carbon black containing composition is exposed, is converted almost totally into heat energy by carbon black, which acts as an absorber.

It is noted that the carbon blacks of the neutralized sulfonated or carboxylated elastomeric composition used to prepare the membrane of this invention, in addition to providing excellent heat aging characteristics, contribute to the required excellent tear strength possessed by these membranes. As those skilled in the art are aware, tear strength, or tear resistance, is a very important property of a membrane. It is speculated that the smaller the size of the carbon black additive, the more tear resistant is the membrane. Obviously, the lower limit on particle size is dictated by the ability to disperse the carbon black in the polymer. As those skilled in the art are aware, the ability to disperse a fine particle size filler is in decreased order with decreasing particle size.

The membrane of this invention may be unsupported or supported. When a neutralized sulfonated or carboxylated elastomeric composition is used to form an unsupported membrane, the concentration and physical characteristics of the carbon black employed is important. A carbon black particle size of less than 200 millimicrons is preferred. More preferably, the particle size of the carbon black employed in an unsupported membrane is from 10 to 100 millimicrons. Most preferably, the particle size of the carbon black employed is in the range of between 10 to 50 millimicrons.

In the preferred embodiment wherein the membrane of this invention is supported, that is, in the case where in addition to at least one ply of elastomeric sheet the membrane of this invention includes at least one ply of a sheet of reinforcing material, the carbon black in the neutralized acid group containing elastomeric sheet has an unlimited particle size. In this embodiment smaller particle sized carbon black is not critical to adequate tear resistance.

In addition to these essential components in the composition which are provided in the elastomeric sheet of the membrane of the instant invention, other components may be provided in the elastomeric sheet of the membrane of this invention. Such a component is an antioxidant. The class of antioxidant employed in the present invention is one selected from the group consisting of substituted aromatic amines, substituted phenols, aryl phosphites and metal dialkyl dithiocarbamates.

Antioxidants which can be used in the elastomeric sheet composition of the membrane of this invention include, but are not limited to, dioctyldiphenylamine, dinonyldiphenylamine, didodecyldiphenylamine, di(alpha-methylbenzyl)diphenylamine, di(alpha,-alpha-dimethylbenzyl)diphenylamine, and various other alkyl or aralkyl substituted diphenylamines and mixtures thereof; also 2,2'-methylenebis(4-methyl-6-t-butylphenol), 2,2'-methylenebis(4-methyl-6-nonylphenol), styrenated phenol, polybutylated Bis-phenol A, tetrakis [methylene(3,5-di-t-butyl-4-hydroxyhydrocinnamate) methane, octadecyl beta(3,5-di-t-butyl-4-hydroxyphenyl)propionate and various other substituted phenols and bis phenols; also tris (nonylphenyl)phosphite and other substituted aryl phosphites; also nickel dibutyldithiocarbamate, polymeric 1,2-dihydro-2,2,4-trimethylquinoline, mercaptobenzamidazole, alkylated mercaptobenzamidazole, and the zinc salt of mercaptobenzamidazole. Alkyl thiodipropionate synergists may also be employed in the antioxidant package.

Particularly preferred antioxidants for use in the elastomeric composition sheet of this invention are the alkyl and aralkyl diphenylamines.

Another component that may be included in the elastomeric sheet is a mineral filler. The mineral fillers contemplated for use in the present invention include, but are not limited to, silica, either precipitated or ground, talc, synthetic magnesium sulfate, calcium carbonate, precipitated or ground, calcined clay, hydrated clay and mixtures thereof. These fillers are oftentimes useful in promoting the processability of the composition either by extrusion or calendering.

Yet another component that may be advantageously added to the composition that is extruded or calendered into the elastomeric sheet of this invention is a polyolefin thermoplastic. Polyolefin thermoplastics modify the hardness of the composition as well as modifying and improving its rheological properties. Among the polyolefins, polyethylene is preferred, with high density polyethylene especially preferred.

Still another component that may be provided in the composition that is formed into the elastomeric sheet of this invention is a release agent. Release agents promote processability of the composition which is shaped into the elastomeric sheet of the membrane of this invention. They are especially preferred for use in producing good release of the composition from calendering rolls when the sheet is formed by calendering. Release agents within the contemplation of this invention include, but are not restricted to, primary and secondary amides, ethylenebis amides and waxes. The preferred class of release agents are primary amides. A particularly preferred release agent is erucamide.

Yet still another component that may be incorporated into the composition that is extruded or calendered into the elastomeric sheet of the current invention is a microbiocide. This component is usefully added in those cases where the elastomeric sheet is to be employed in a climate conducive to infestation of fungi and other microorganisms which may deteriorate or diminish the effectiveness of the membrane. The preferred microbiocide is selected from the group consisting of 2,2'-thiobis(4,6-dichlorophenol), 10,10'-oxybisphenoarsine, 8-hydroxyquinoline and zinc dimethyldithiocarbamate.

The last preferred component that may be provided in the composition of this invention is at least one flame retardant. Flame retardants within the contemplation of this invention are components whose use as flame retardants is well known to those skilled in the art. Examples of these known flame retardants are halogenated organic compounds, phosphorus containing compounds, antimony oxide and aluminum hydroxide.

In the formulation of the composition that is formed into the elastomeric sheet of the membrane of this invention on a weight basis of 100 parts of the neutralized acid group containing elastomeric polymer, 5 to 50 parts of the preferential plasticizer are added. More preferably, the concentration of the preferential plasticizer is 10 to 30 parts. The non-polar process oil is present in a concentration of from 10 to 250 parts. More preferably, the non-polar process oil comprises 60 to 150 parts and most preferably 65 to 85 parts. The carbon black is present in the concentration of from 2 to 200 parts. More preferably, the carbon black concentration is in the range of from 50 to 150 parts. Most preferably, the carbon black constituent includes 65 to 100 parts.

Again, based on a 100 parts by weight of the neutralized acid group containing elastomeric composition, the amounts of the optional components include 0.05 to 5 parts of the antioxidant. More preferably, if the antioxidant is present its concentration is 0.2 to 2.5 parts, and most preferably 0.5 to 2.0 parts.

The mineral filler, if present, is provided in a concentration of 1 to 150 parts.

In the case of the polyolefin additive, the release agent, the microbiocide and the flame retardant, these components are added in an effective amount sufficient to provide the specialized function these additives provide. Those skilled in the art will appreciate that these concentrations will vary with the particular application to which the membrane of the instant invention is employed.

Turning now to the method of fabricating the membrane of this invention and focusing initially on an unsupported membrane, a membrane comprising one or more plies of elastomeric sheet may be formed by extrusion. Extrusion is a well established process for fabricating thermoplastic compositions. Since the unique elastomeric sheet of this composition, although possessing properties at ambient temperatures analogous to vulcanized rubbers, is processable at elevated temperatures in a manner analogous to thermoplastics, this convenient method of fabrication is available to produce the membrane of this invention.

In the extrusion of the elastomeric sheet of this invention, the elastomeric composition is heated to elevated temperature in the range of between 100° and 250° C. At those elevated temperatures the composition is masticated, that is, subjected to shear force. This mastication is preferably performed in a rotating extrusion screw. The heated and masticated composition is extruded through a forming die. This die has uniform orifice dimensions suitable to produce the elastomeric sheet, which in the case of an unsupported membrane constitutes the membrane. The sheet, at elevated temperature after being extruded through the die is cooled to produce a flexible elastomeric sheet comprising the membrane of this invention. Alternatively, the elastomeric extruded sheet is conveyed to further processing, treatment or construction stations. The sheet, or membrane, upon cooling develops the required physical properties necessary for waterproof applications. This membrane can be wound onto a roll for easy transportation or further processing, generally without the need for partitioning agents. If preferred, two or more plies of the elastomeric sheet may be simultaneously extruded out of two or more dies and laminated together to form an elastomeric laminate.

The other preferred fabricating method is calendering. Calendering is another well known method for processing thermoplastics, elastomerics and the like, in which the composition to be formed into sheet is heated to a molten condition and thence rolled out as smooth sheet of the desired thickness, width and physical properties by the mechanical action of counter-rotating cylindrical rolls. In the calendering procedure to produce the membrane of this invention, it is preferred that the spacing between cylindrical rolls be between 5 and 200 mils, that is, between 0.005 and 0.2 inch. In the case of the elastomeric composition of the instant invention, the composition is preferably heated to a temperature range of between 100° to 250° C.

A particular advantage of calendering in the forming of the elastomeric sheet of this invention is the ability to provide a laminate of two or more plies. The utilization of a laminate ensures the integrity of the elastomeric sheet against leakage caused by defects or flaws that may be present in any individual ply. Lamination can be conducted simultaneously with the calendering of individual plies. This is accomplished by the use of a multiple roll calender, for example, a four-roll calender. In the case of the four roll calender, two plies are formed by calendering by the two outermost nips and then combined and bonded by heat and pressure in the third central nip.

Alternatively, lamination by calendering can be conducted sequentially. In this method a calendered sheet is laminated onto another already formed calendered sheet by methods known to those skilled in the art.

A preferred embodiment of the instant invention is a supported membrane. The supported membrane of this invention is, like the unsupported membrane, flexible. However, it includes at least one sheet of a supporting material. The one or more plies of supporting sheet are preferably fabric, woven or non-woven, paper or metal foil. Of these, fabric sheet is preferred.

Fabric sheet used as reinforcement are commonly referred to as scrim. As stated above, two types of scrim are available, woven and non-woven. Whether the fabric is woven or non-woven, it is preferred that the fabric be polyester, polypropylene, polyethylene, polyamide or combinations of two or more of these synthetic fabrics.

In the case where a non-woven fabric is employed, the non-woven construction may comprise needle punched or spun-bonded fabric. However, the most preferred reinforcing agent is woven fabric. This is because the open weave construction permits excellent integral strength provided by the mechanical bond created between the elastomeric plies striking through the open weave.

It should be appreciated that the supporting or reinforcing ply or plies, whatever its material, can be chemically treated or coated to further enhance ply adhesion.

The resulting supported membrane has as its main function increased strength, especially, tear strength. Supported membrane, especially open weave reinforced scrim, improves the tear strength compared to the unsupported elastomeric sheet.

Incorporation of reinforcing sheet or sheets to form the supported membrane embodiment of the present invention can be accomplished during the calendering or extrusion process employed in forming the elastomeric sheet of this invention. In a preferred embodiment wherein a supported membrane is formed by extrusion or calendering, a supporting substrate, preferably woven fabric, is synchronously fed between two elastomeric sheets downstream of the extruder dies or calender rolls. The two elastomeric plies sandwich therebetween a ply of the supporting substrate, to form a three ply laminate by means of heat and pressure provided by a pair of laminating rolls. Multiple laminates of more than three plies can also be fabricated. Of course, a two ply laminate of elastomeric and support plies can also be formed. Likewise, the lamination procedure can be conducted in a non-simultaneous, step wise manner as is known to those skilled in the art.

As mentioned earlier a principal application of the membrane of the present invention is as a roof covering. The types of roof which are preferably covered by the membrane of this invention are flat or slightly sloped and include new or retrofitted roof installations. The roof surface which is covered by the instant membrane, referred to as the roof deck, may be wood, cement, metal, concrete or combinations thereof. In addition, the membrane of this invention employed as a roof covering, may be affixed to insulation which may be disposed over the aforementioned roof decks. Insulation such as wood fiberboard, expanded polystyrene, fiber glass board and rigid polyurethane board may be covered with the supported or unsupported membrane of this invention. In installing the roof covering, the covering may be fully bonded to the roof surface, spot bonded to the roof surface, that is, partially bonded, loose laid and ballasted, or mechanically bonded by methods such as battens, discs or buttons.

In addition to its use as a roof covering, the membrane of this invention may be employed in the closely related function of roof flashing. In this function the membrane covers roof protrusions, drains, gutters, outlets, edge trims, parapet wall terminations, corners and other roof details.

Another utility of the membrane of this invention, again taking advantage of its waterproof and weatheraging properties, is as a covering for outdoor water storage and conveyance systems. In this function the membrane of this invention is employed as a pond liner, a pit liner or aqueduct liner. These applications have grown tremendously in importance in recent years. Ponds and pits are increasingly being used to treat and dispose of aqueous wastes from such facilities as chemical plants, power plants and mines.

The membranes of the current invention, as stated earlier provide the same water impermeability and weather resistance as do such vulcanized rubbers as Butyl rubber and EPDM. However, because these rubbers are vulcanized, they can only be formed during installation into the large panels necessary for use as roof coverings, pond liners, etc. by means of adhesive bonding of smaller sized membranes. Such adhesive seams are subject to delamination under the stressful conditions encountered in pond, pit and aqueduct liners. Indeed, stressful conditions are oftentimes encountered on roofs also.

The membranes of the instant invention are "seamed" together to provide the large required panel sizes necessary for roof coverings, pond liners and the like by much more effective, longer lasting and cheaper means. In the instant invention the membranes are seamed together by heat sealing, solvent welding, adhesive bonding, tape bonding or combinations thereof. The preferred means of seaming is that method not available to the thermosetting rubbers of the prior art, heat sealing. When heat sealing is employed, the most desirable method is hot air welding. It is noted that heat sealing by such means as hot air welding provides a high strength integral bond without the introduction of any foreign material.

The following examples are provided to illustrate the instant invention. The scope of this invention should therefore not be interpreted as being limited by the scope of these examples.

EXAMPLE 1

An elastomeric composition was prepared by mixing 100 parts (when parts are recited, parts by weight is to be inferred) of zinc sulfonated EPDM terpolymer (ZSEPDM); 25 parts zinc stearate; 75 parts of Sunpar (trademark) 2280, a paraffinic non-polar processing oil; 15 parts of Marlex (trademark) MWN 6060, a high density polyethylene; 1.5 parts of Naugard (trademark) 445, an alkylated diphenylamine antioxidant; 60 parts of N-110 carbon black (carbon black N numbers are defined in ASTM D-1765); and 30 parts of N-550 carbon black in a No. 2 Farrel Continuous Mixer (FCM) (trademark). The ingredients were mixed in the FCM at 200° C. and 300 revolutions per minute to produce a homogeneous composition.

The homogeneous composition was discharged from the FCM orifice without cooling into a 4 inch extruder to form continuous strands extruded from the multiple orifice die of the extruder. The strands were cooled in a water bath, dried with an air knife blower and diced into pellets using a rotary blade cutter. The pellets were thereafter dried at 70° C. for 4 hours.

The dried pellets were fed and extruded in a 4½ inch extruder with barrel sections heated to 130°–150° C. The composition itself was heated to approximately 180° C. and subjected to the shearing action of the extruder screw. The composition was formed into sheet by extruding the molten composition through a 74 inch wide flex-lip die which had nip settings uniformly set at 50 mils.

The formed sheet was further shaped and polished by three 18 inch by 74 inch take-off and polishing rolls. The sheet was cooled to ambient temperature and wound onto itself into rolls with no partitioning agent required between sheet layers. The sheet on the roll had the dimensions: 72 inches wide by 55 mils (0.055 inch) thick).

The rolls were transported to the roof site. The 72 inch wide sheet was assembled into panels having the dimensions 10 feet by 50 feet and 12 feet by 50 feet. This was accomplished by seaming the 72 inch wide sheet using 40 mm wide lap seams using a Leister (trademark) X-10 hot air welder. The above recited sized panels were then installed on a commercial flat roof, covering about 10,000 square feet, by seaming the panels to form a continuous roof covering again using the Leister (trademark) X-10 hot air welder. The roof covered was a failed conventional built-up asphalt roof laid over a pre-cast cellular concrete deck. Prior to covering by the panels, the roof surface was cleaned and covered with ½ inch thick, 4 feet by 8 feet wood fiberboard insulation boards which were anchored to the deck. The roofing panels were spot bonded to the flat fiberboard using Roayl (trademark) M6504 contact adhesive.

Roof flashing at parapet walls, aprons, gutters, chutes and outlets was prepared from small pieces of the same elastomeric sheet that was formed into panels. Seaming of the flashing sections to itself and to the larger roof panel was accomplished by using Royal (trademark) M6504 contact adhesive. Heat sealing of this flashing was also provided by a Leister Variant (trademark) hand held hot air welder.

This roof has been installed and has been functioning totally free of leaks.

EXAMPLE 2

An elastomeric composition comprising 100 parts (by weight) of ZSEPDM; 35 parts of zinc stearate; 75 parts of Tufflo (trademark) 6056, a paraffinic non-polar process oil; 60 parts of HiSil (trademark) 223, a fine particle size precipitated silica; 10 parts of ASTM D-1765 N-550 carbon black; and 1 part of Irganox (trademark) 1010, a hindered phenolic antioxidant, was prepared by mixing the ingredients in a No. 11 Banbury (trademark) mixer at 150° C.

The homogeneous mixture was discharged onto a two-roll mill heated to 100° C. The mixture was thus formed into sheet which was cut from the mill and cooled to form 8 foot by 2 foot by about ⅛ inch slabs.

These slabs were remelted and fed onto a four-roll inverted L calender whose rolls were heated to 115°–125° C. Two sheets were simultaneously calendered in the two outermost nips, combined and conveyed through the center nip and laminated together using pressure from an external laminating roll to form an integral membrane 55 mils thick by 54 inches wide. This membrane was continuously conveyed, cooled and then wound onto a roll, 100 yards per roll. No partitioning agent was used, nor was any required, between the membrane on the roll.

The laminated membrane was later unrolled, cut and fabricated into 20 foot by 50 foot panels by heat seaming together 20 foot long sections of the membrane. These integral lap seams were prepared under a pressure of 40 psi and a temperature of 135° C. in a heated beam press. Completed panels were trimmed, folded and rolled up for transportation.

The membrane panels were installed on a commercial flat roof covering about 11,000 ft² in the same manner as described in Example 1. Thus adhesive spot bonding was used to attach the membrane to the roof, which was a failed built-up asphalt and felt roof having a wood deck. Field lap seams between membrane panels were prepared on the roof using Royal (trademark) M6317 contact adhesive.

This roof has been functioning totally free of leaks.

EXAMPLE 3

An elastomeric composition was prepared by mixing 100 parts of ZSEPDM; 25 parts of zinc stearate; 100 parts of Sunpar (trademark) 2280; 100 parts of ASTM D-1765 N-744 carbon black; 100 parts of NuCap (trademark) 200L, a hydrated aluminum silicate (clay) mineral filler; and 1 part of Naugard (trademark) 445 in a "B" Banbury (trademark) mixer heated to 140° C. for 5 minutes.

The composition was milled in a two roll mill at 125° C. to which 1 part of Kemamide (trademark) E (erucamide) was added. The composition was then calendered at 125° C. into two equally thick sheets which were laminated together between Burlington (trademark) 67050-10×10 fabric, a woven polyester scrim. The total laminate membrane was 30 mils thick.

The membrane was tested to determine its "trouser tear" resistance. This property is important to utilization of the membrane on roofs, under ponds and the like where structural integrity is essential for leak proof operation. The tear test was conducted in accordance with ASTM D-1938-67 modified to a pull rate of 20 inches per minute. The resultant tear strength was 580 pounds per inch. The same test was repeated for elastomeric sheet without scrim. The test, unitized to report unit thickness strength, resulted in a tear strength of 70 pounds per inch.

The aforementioned preferred embodiments and examples are given to illustrate the scope and spirit of the instant invention. These embodiments and examples will make apparent to those skilled in the art other embodiments and examples within the scope of this invention. These other embodiments and examples are within the contemplation of the present invention.

Thus, the instant invention should be limited only to the appended claims.

What is claimed is:

1. A method of waterproofing a surface comprising:
   (a) forming a first sheet of an elastomeric composition comprising:
       a neutralized acid group containing elastomeric polymer, said neutralized acid group containing a cation selected from the group consisting of ammonium, antimony, aluminum, iron, lead and a metal of Group IA, IIA, IB or IIB of the Periodic Table of Elements and mixtures thereof;
       a non-polar process oil;
       carbon black; and
       a preferential plasticizer;
   (b) forming a second sheet of said elastomeric composition which may be the same or different from said first sheet;
   (c) disposing said sheets upon said surface; and
   (d) heat sealing at least one edge of said first sheet to at least one edge of said second sheet.

2. A method according to claim 1 wherein at least one of said sheets comprises a mineral filler.

3. A method according to claim 1 wherein at least one of said sheets comprises an antioxidant selected from the group consisting of substituted aromatic amines, substituted phenols, aryl phosphites and metal dialkyl dithiocarbamates.

4. A method according to claim 1 wherein at least one of said sheets comprises a thermoplastic polyolefin.

5. A method according to claim 1 wherein at least one of said sheets comprises a release agent.

6. A method according to claim 1 wherein at least one of said sheets comprises a microbiocide.

7. A method according to claim 1 wherein at least one of said sheets comprises a flame retardant.

8. A method according to claim 1 wherein at least one of said sheets comprises a supporting sheet, said supporting sheet selected from the group consisting of fabric, paper and metal foil.

9. A method according to claim 8 wherein said sheet with said supporting sheet comprises a mineral filler.

10. A method according to claim 8 wherein said supporting sheet is sandwiched between at least two of said elastomeric composition sheets.

11. A method according to claim 8 wherein said supporting sheet is fabric.

12. A method according to claim 11 wherein said fabric is woven.

13. A method according to claim 1 wherein in at least one of said sheets, said neutralized acid group is sulfonate.

14. A method according to claim 1 wherein in at least one of said sheets, in the absence of a preferential plasticizer, said neutralized acid group is carboxylate.

15. A method according to claim 1 wherein in at least one of said sheets said elastomeric polymer is selected from the group consisting of EPDM and Butyl rubber.

16. A method of waterproofing a surface comprising:
    (a) forming a first sheet of an elastomeric composition comprising:
        100 parts of a neutralized sulfonated elastomeric polymer containing 10 to 50 milliequivalents neutralized sulfonate groups per 100 grams of elastomeric polymer, said neutralized sulfonate groups containing a cation selected from the group consisting of ammonium, antimony, aluminum, iron, lead, a metal of Group IA, IIA, IB or IIB of the Periodic Table of Elements and mixtures thereof;

10 to 250 parts of a non-polar process oil;

5 to 50 parts of a preferential plasticizer selected from the group consisting of a basic salt of a carboxylic acid having 2 to 30 carbon atoms, said salt containing a cation selected from the group consisting of antimony, aluminum, iron, lead, a metal of Group IA, IIA, IB or IIB of the Periodic Table of Elements and mixtures thereof and an organic amide having the formula $R^1CONR^2R^3$ where $R^1$ is an aliphatic group and $R^2$ and $R^3$ are the same or different and are hydrogen, alkyl, aryl, aralkyl or the group $-CH_2CH_2NHCOR^1$, and where at least one of $R^1$, $R^2$ and $R^3$ has at least 5 carbon atoms; and 2-200 parts of carbon black;

all said parts being by weight;

(b) forming a second sheet of said elastomeric composition which may be the same or different from said first sheet;

(c) disposing said sheets upon said surface; and (d) heat sealing at least one edge of said sheet to at least one edge of said second sheet.

17. A method according to claim 16 wherein said carbon black is present at from 65 to 200 parts per 100 parts of elastomeric polymer.

18. A method according to claim 16 wherein in at least one of said sheets said elastomeric polymer is selected from the group consisting of EPDM and Butyl rubber.

19. A method of protecting a roof comprising:
(a) forming a first sheet of an elastomeric composition comprising:
a neutralized acid group containing elastomeric polymer, said neutralized acid group containing a cation selected from the group consisting of ammonium, antimony, aluminum, iron, lead and a metal of Group IA, IIA, IB or IIB of the Periodic Table of Elements and mixtures thereof;
a non-polar process oil;
carbon black; and
a preferential plasticizer;
(b) forming a second sheet of said elastomeric composition which may be the same or different from said first sheet;
(c) disposing said sheets upon said roof; and
(d) heat sealing at least one edge of said first sheet to at least one edge of said second sheet.

20. A method of protecting a roof comprising:
(a) forming a first sheet of an elastomeric composition comprising:
100 parts of a neutralized sulfonated elastomeric polymer containing 10 to 50 milliequivalents neutralized sulfonate groups per 100 grams of elastomeric polymer, said neutralized sulfonate groups containing a cation selected from the group consisting of ammonium, antimony, aluminum, iron, lead, a metal of Group IA, IIA, IB or IIB of the Periodic Table of Elements and mixtures thereof;
10 to 250 parts of a non-polar process oil;
5 to 50 parts of a preferential plasticizer selected from the group consisting of a basic salt of a carboxylic acid having 2 to 30 carbon atoms, said salt containing a cation selected from the group consisting of antimony, aluminum, iron, lead, a metal of Group IA, IIA, IB or IIB of the Periodic Table of Elements and mixtures thereof and an organic amide having the formula $R^1CONR^2R^3$ where $R^1$ is an aliphatic group and $R^2$ and $R^3$ are the same or different and are hydrogen, alkyl, aryl, aralkyl or the group $-CH_2CH_2NHCOR^1$, and where at least one of $R^1$, $R^2$ and $R^3$ has at least 5 carbon atoms; and
2-200 parts of carbon black;
all said parts being by weight;
(b) forming a second sheet of said elastomeric composition which may be the same or different from said first sheet;
(c) disposing said sheets upon said roof; and
(d) heat sealing at least one edge of said first sheet to at least one edge of said second sheet.

21. A method according to claim 20 wherein said carbon black is present at from 65 to 200 parts per 100 parts of elastomeric polymer.

22. A method according to claim 20 wherein in at least one of said sheets said elastomeric polymer is selected from the group consisting of EPDM an Butyl rubber.

23. A method of protecting a roof comprising:
(a) forming a first sheet of flashing of an elastomeric composition comprising:
a neutralized acid group containing elastomeric polymer, said neutralized acid group containing a cation selected from the group consisting of ammonium, antimony, aluminum, iron, lead and a metal of Group IA, IIA, IB or IIB of the Periodic Table of Elements and mixtures thereof;
a non-polar process oil;
carbon black; and
a preferential plasticizer;
(b) disposing said first sheet of flashing upon said roof;
(c) heat sealing at least one edge of said first flashing to at least one other edge of said first flashing; or
(d) forming a second sheet of flashing of said elastomeric composition which may be the same or different from said first sheet of flashing;
(e) disposing said second sheet of flashing adjacent said first sheet of flashing; and
(f) heat sealing at least one edge of said sheet of flashing to at least one edge of said second sheet of flashing.

24. A method according to claim 23 wherein in at least one of said sheets of flashing said elastomeric polymer is selected from the group consisting of EPDM and Butyl rubber.

25. A method of lining a pond or pit bottom which comprises:
(a) forming a first sheet of an elastomeric composition comprising:
a neutralized acid group containing elastomeric polymer, said neutralized acid group containing a cation selected from the group consisting of ammonium, antimony, aluminum, iron, lead and a metal of Group IA, IIA, IB or IIB of the Periodic Table of Elements and mixtures thereof;
a non-polar process oil;
carbon black; and
a preferential plasticizer;
(b) forming a second sheet of said elastomeric composition which may be the same or different from said first sheet;
(c) disposing said sheets upon said pond or pit bottom; and (d) heat sealing at least one edge of said first sheet to at least one edge of said second sheet.

26. A method according to claim 25 wherein in at least one of said sheets said elastomeric polymer is selected from the group consisting of EPDM and Butyl rubber.

27. A roof having disposed thereon a structure comprising a first sheet of an elastomeric composition comprising:
   a neutralized acid group containing elastomeric polymer, said neutralized acid group containing a cation selected from the group consisting of ammonium, antimony, aluminum, iron, lead and a metal of Group IA, IIA, IB or IIB of the Periodic Table of Elements and mixtures thereof;
   a non-polar process oil;
   carbon black; and
   a preferential plasticizer; heat sealed on at least one edge to a second sheet of said elastomeric composition which may be the same or different from said first sheet.

28. A roof having disposed thereon a structure comprising:
   (a) forming a first sheet of an elastomeric composition comprising:
      100 parts of a neutralized sulfonated elastomeric polymer containing 10 to 50 milliequivalents neutralized sulfonate groups per 100 grams of elastomeric polymer, said neutralized sulfonate groups containing a cation selected from the group consisting of ammonium, antimony, aluminum, iron, lead, a metal of Group IA, IIA, IB or IIB of the Periodic Table of Elements and mixtures thereof;
      10 to 250 parts of a non-polar process oil;
      5 to 50 parts of a preferential plasticizer selected from the group consisting of a basic salt of a carboxylic acid having 2 to 30 carbon atoms, said salt containing a cation selected from the group consisting of antimony, aluminum, iron, lead, a metal of Group IA, IIA, IB or IIB of the Periodic Table of Elements and mixtures thereof and an organic amide having the formula $R^1CONR^2R^3$ where $R^1$ is an aliphatic group and $R^2$ and $R^3$ are the same or different and are hydrogen, alkyl, aryl, aralkyl or the group $-CH_2CH_2NHCOR^1$, and where at least one of $R^1$, $R^2$ and $R^3$ has at least 5 carbon atoms; and
      2–200 parts of carbon black;
      all said parts being by weight;
   heat sealed on at least one edge to a second sheet of said elastomeric composition which may be the same or different from said first sheet.

29. A roof according to claim 28 wherein said carbon black is present at from 65 to 200 parts per 100 parts of elastomeric polymer.

30. A roof according to claim 28 wherein in at least one of said sheets said elastomeric polymer is selected from the group consisting of EPDM and Butyl rubber.

* * * * *